US009046032B2

(12) United States Patent
Wu

(10) Patent No.: US 9,046,032 B2
(45) Date of Patent: Jun. 2, 2015

(54) STRATIFIED CHARGE ENGINE WITH TURBOCHARGER

(71) Applicant: GM GLOBAL TECHNOLOGY OPERATIONS LLC, Detroit, MI (US)

(72) Inventor: Ko-Jen Wu, Troy, MI (US)

(73) Assignee: GM Global Technology Operations LLC, Detroit, MI (US)

(\*) Notice: Subject to any disclaimer, the term of this patent is extended or adjusted under 35 U.S.C. 154(b) by 82 days.

(21) Appl. No.: 13/837,605

(22) Filed: Mar. 15, 2013

(65) Prior Publication Data

US 2014/0260240 A1     Sep. 18, 2014

(51) Int. Cl.
| | | |
|---|---|---|
| *F02D 23/00* | (2006.01) | |
| *F02B 37/18* | (2006.01) | |
| *F02M 25/07* | (2006.01) | |
| *F02B 37/12* | (2006.01) | |
| *F02D 41/30* | (2006.01) | |
| *F02D 41/00* | (2006.01) | |
| *F02B 17/00* | (2006.01) | |
| *F02B 29/04* | (2006.01) | |
| *F02B 37/00* | (2006.01) | |

(52) U.S. Cl.
CPC ............ *F02B 37/18* (2013.01); *F02M 25/0771* (2013.01); *F02B 29/0437* (2013.01); *F02B 37/00* (2013.01); *F02M 25/0709* (2013.01); *F02B 37/127* (2013.01); *F02D 41/3023* (2013.01); *F02D 41/3029* (2013.01); *F02D 41/0007* (2013.01); *F02D 2200/101* (2013.01); *F02B 17/005* (2013.01); *Y02T 10/144* (2013.01)

(58) Field of Classification Search
CPC ............ F02B 37/18; F02B 37/16; F02B 3/06; F02M 25/0706; F02D 41/0007
USPC .................... 60/602, 600, 605.2; 123/568.11; 701/108
See application file for complete search history.

(56) References Cited

U.S. PATENT DOCUMENTS

| | | | | |
|---|---|---|---|---|
| 6,561,157 B2 * | 5/2003 | zur Loye et al. | ............... | 123/299 |
| 2008/0208435 A1 * | 8/2008 | Bryant | ........................ | 701/103 |
| 2011/0155108 A1 * | 6/2011 | Russ | ............................. | 60/602 |

FOREIGN PATENT DOCUMENTS

WO      WO 2011160260 A1 * 12/2011      ............. F02M 31/00

OTHER PUBLICATIONS

A. Kneifel, S. Burl, A. Velji, U. Spicher, J. Pape and M. Sens, "Investigations on Supercharging Stratified Part Load in a Spray-Guided DI SI Engine," SAE paper 2008-01-0143. Published Apr. 14, 2008, pp. 1-8.

O. Lang, K. Habermann, K. Krebber-Hortmann, A. Sehr, M. Thewes, H. Kleeberg and D. Tomazic, "Potential of the Spray-guided Combustion System in Combination with Turbocharging," SAE paper 2008-01-0139. Published Apr. 14, 2008, pp. 1-10.

\* cited by examiner

*Primary Examiner* — Thai Ba Trieu
*Assistant Examiner* — Ngoc T Nguyen
(74) *Attorney, Agent, or Firm* — Cantor Colburn LLP

(57) ABSTRACT

In an embodiment, a method for turbocharging a stratified charge engine includes flowing, in a turbocharged mode, exhaust gas from the engine into a turbocharger based on the engine having a load greater than a threshold load and the engine operating in a first range of engine speeds, the threshold load comprising a peak load for engine operation in a naturally-aspirated mode using a lean air-fuel mixture and providing, by the turbocharger while in the turbocharged mode, an increased amount of air to a combustion chamber in the engine based on the turbocharger receiving the exhaust gas. The method also includes restricting flow, in the naturally-aspirated mode, of the exhaust gas into the turbocharger based on at least one of: the engine having a load less than the threshold load or the engine operating in a second range of engine speeds, the second range being greater than the first range.

20 Claims, 3 Drawing Sheets

STRATIFIED CHARGE ENGINE WITH TURBOCHARGER

FIELD OF THE INVENTION

The subject invention relates to stratified charge engines and more particularly to forced induction systems for stratified-charge engines.

BACKGROUND

In stratified charge engines, fuel is injected into a combustion chamber just before the fuel is ignited by a spark plug. Typically, a stratified charge engine has an injector positioned in the combustion chamber to inject the fuel proximate the spark plug. This allows for higher compression ratios without pre-combustion or "knock" and leaner air/fuel mixtures than in conventional internal combustion engines.

Since fuel is not present in the combustion chamber until the point of combustion beginning, there is reduced risk of pre-combustion or engine knock. The engine may also run on a much leaner overall air/fuel ratio because the stratified charge provides a richer air/fuel mixture proximate the spark plug and a leaner air/fuel mixture elsewhere in the chamber. Accordingly, the stratified charge is non-homogenous, as opposed to air/fuel mixtures of typical spark-ignition engines. A higher mechanical compression ratio may also be used in stratified charge engines for better thermodynamic efficiency.

In some cases, the stratified charge engines experience improved efficiency due to the leaner air/fuel mixtures and due to reduced pumping losses. Pumping losses are caused by work required to move air into and out of the cylinders, where the losses increase with engine speed. The pumping losses are increased significantly with a reducing load when throttling. Stratified charge engines may only exhibit improved efficiency in a limited load range as the engine reaches air intake limits at lower load levels due to an increased amount of air and exhaust gas required in the combustion process.

SUMMARY OF THE INVENTION

In one exemplary embodiment of the invention, a stratified charge engine system includes a combustion chamber in a cylinder head of an engine, an exhaust gas conduit in fluid communication with the combustion chamber, a turbocharger in fluid communication with the combustion chamber, a flow control device, wherein a position of the flow control device controls flow of exhaust gas from the combustion chamber to the turbocharger and to the exhaust gas conduit and a controller coupled to the flow control device. The controller has a first mode that causes the flow control device to direct flow of the exhaust gas to the turbocharger based on a load of the engine being greater than a threshold load and the stratified charge engine operating in a first range of engine speeds, the threshold load being a peak load for engine operation in a naturally-aspirated mode using a lean air-fuel mixture, and a second mode that causes the flow control device to direct flow of the exhaust gas to the exhaust gas conduit based on one of the load of the engine being less than the threshold load, or the engine operating in a second range of engine speeds greater than the first range of engine speeds, wherein the turbocharger provides an increased amount of air to the combustion chamber for an increased fuel intake to maintain a lean air-fuel mixture above the threshold load when operating in the first range of engine speeds.

In another exemplary embodiment of the invention, a method for turbocharging a stratified charge engine includes flowing, in a turbocharged mode, exhaust gas from the stratified charge engine into a turbocharger based on the stratified charge engine having a load greater than a threshold load and the stratified charge engine operating in a first range of engine speeds, the threshold load comprising a peak load for engine operation in a naturally-aspirated mode using a lean air-fuel mixture and providing, by the turbocharger while in the turbocharged mode, an increased amount of air to a combustion chamber in the stratified charge engine based on the turbocharger receiving the exhaust gas, the increased amount of air substantially maintaining the lean air-fuel mixture for an increased amount of fuel provided to the combustion chamber. The method also includes restricting flow, in the naturally-aspirated mode, of the exhaust gas into the turbocharger based on at least one of: the stratified charge engine having a load less than the threshold load or the stratified charge engine operating in a second range of engine speeds, the second range being greater than the first range.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
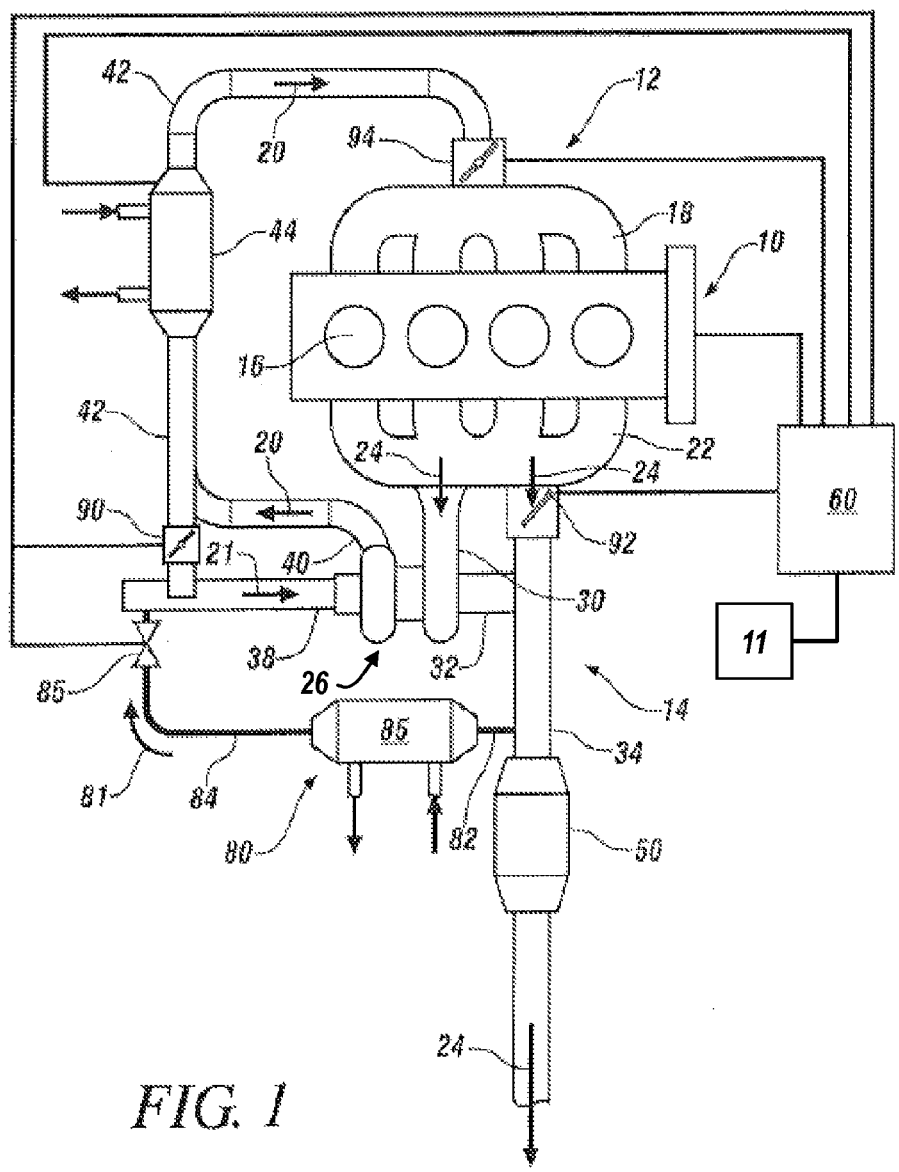
FIG. 1 illustrates an exemplary system with a stratified charge engine including a turbocharger, an exhaust system and an air intake system.

The following description is merely exemplary in nature and is not intended to limit the present disclosure, its application or uses. It should be understood that throughout the drawings, corresponding reference numerals indicate like or corresponding parts and features. As used herein, the terms controller and module refer to an application specific integrated circuit (ASIC), an electronic circuit, a processor (shared, dedicated, or group) and memory that executes one or more software or firmware programs, a combinational logic circuit, and/or other suitable components that provide the described functionality. In embodiments, a controller or module may include one or more sub-controllers or sub-modules.

Referring to FIG. 1, an exemplary embodiment of a stratified charge engine system is illustrated, the system including a stratified charge engine 10. The exemplary stratified charge engine is an in-line four cylinder internal combustion engine, having an intake system 12 and an exhaust system 14. The stratified charge engine 10 includes a plurality of cylinders 16 into which a combination of combustion air and fuel are introduced. The cylinders 16 include combustion chambers located in a cylinder head of the stratified charge engine 10. The combustion air/fuel mixture is combusted resulting in reciprocation of pistons (not shown) therein. The reciprocation of the pistons rotates a crankshaft (not shown) to deliver motive power to a vehicle powertrain (not shown) or to a generator or other stationary recipient of such power (not shown) in the case of a stationary application of the stratified charge engine 10.

The stratified charge engine 10 includes an intake manifold 18, in fluid communication with the cylinders 16 that receives a compressed intake charge from a compressor in the intake system 12 and delivers the charge to the plurality of cylinders 16. The exhaust system 14 includes an exhaust manifold 22, also in fluid communication with the cylinders 16 (also referred to as "combustion chambers"), which is configured to remove combusted constituents of the combustion air and fuel (i.e. exhaust gas 24) and to deliver it to an exhaust driven turbocharger 26 that is located in fluid communication therewith. The turbocharger 26 includes an exhaust gas turbine wheel (not shown) that is housed within a turbine housing. The turbine housing includes an inlet 30 and an outlet 32. The outlet 32 is in fluid communication with the remainder of the exhaust system 14 and delivers the exhaust gas 24 to an exhaust gas conduit 34. The exhaust gas conduit 34 may include various exhaust gas after treatment devices, such as catalytic converter 50, resonator (not shown) or muffler (not shown). As depicted, the catalytic converter 50 is configured to treat various regulated constituents of the exhaust gas 24 prior to its release to the atmosphere.

The turbocharger 26 also includes an intake charge compressor wheel that is housed within a compressor housing. The compressor wheel (not shown) is coupled by a shaft to the turbine wheel. The compressor housing includes an inlet 38 and an outlet 40. The outlet 40 is in fluid communication with the intake system 12 and delivers a compressed intake charge 20 through an air intake charge conduit 42 to the intake manifold 18. The intake charge 20 is distributed by the intake manifold 18 to the cylinders 16 of the stratified charge engine 10 for mixing with fuel and for combustion therein. In an exemplary embodiment, disposed inline between the compressor housing outlet 40 and the intake manifold 18 is a compressed intake charge cooler 44. The compressed intake charge cooler 44 receives heated (due to compression) compressed intake charge 20 from the intake charge conduit 42 and, following cooling of the compressed intake charge 20 therein, delivers the air (air-exhaust mixture or other mixture) to the intake manifold 18 through a subsequent portion of the intake charge conduit 42.

Located in fluid communication with the exhaust system 14, and in the exemplary embodiment shown in FIG. 1, is an exhaust gas recirculation ("EGR") system 80. The EGR system 80 includes EGR supply conduit 82, EGR inlet conduit 84, and EGR valve 85. In one embodiment, the EGR supply conduit 82 is in fluid communication with and coupled to turbine housing. In addition, the EGR inlet conduit 84 is in fluid communication with and coupled to compressor housing. The EGR supply conduit 82 is configured to divert a portion of the exhaust gas 24 from the conduit 34 and to direct it to, or recirculate it to, the intake system 12 through the turbocharger 26 or conduit 42, where a compressor bypass valve 90 controls a direction of flow for the portion of the exhaust gas 24. As depicted, the EGR valve 85 is in signal communication with a control module such as an engine controller 60. The EGR valve 85 adjusts the volumetric quantity of received exhaust gas 24 that is diverted, as recirculated exhaust gas 81, to the intake system 12, based on the particular engine operating conditions at any given time. The engine controller 60 collects information regarding the operation of the internal combustion engine 10 from various sensors 11, such as temperature (intake system, exhaust system, engine coolant, ambient, etc.), pressure, exhaust system conditions, driver demand and, as a result, may adjust the flow of exhaust gas 24 through the EGR valve 85 to be mixed with fresh air to form the compressed intake charge 20. As a result, the compressed intake charge 20 may comprise a continuously variable combination of fresh air and exhaust gas, depending on the commanded quantity of EGR by the controller 60.

In an embodiment, the controller 60 is coupled to a flow control device 92, such as a valve, that controls flow of the exhaust gas 24 into the conduit 34 and the turbocharger 26. For example, when the flow control device 92 is in a closed position, flow of the exhaust gas 24 into the conduit 34 is substantially restricted and the exhaust gas 24 flow is directed into the turbocharger. In an embodiment where the flow control device 92 is in an open position, the exhaust gas 24 is directed to flow through the conduit 34 and exhaust gas 24 flow is restricted from flowing through the turbocharger 26. In one embodiment, the open flow control device 24 provides a flow path through the conduit 34 which has less resistance to flow than the turbocharger (containing a turbine wheel that is rotated by exhaust flow), thus directing the exhaust gas 24 to flow in the conduit 34.

Embodiments include a method for turbocharging the stratified charge engine 10 where the exhaust gas 24 flows into the turbocharger 26 based on the stratified charge engine 10 having a load greater than a threshold load and the stratified charge engine 10 operating at a first range of engine speeds. In one embodiment, the threshold load is a peak or maximum load at a selected engine speed when operating in a naturally-aspirated mode while using a lean air-fuel mixture. The engine load may not exceed the threshold load at the selected speed in the naturally-aspirated mode without adding fuel to the air-fuel mixture, thus making the mixture richer and the engine operation less efficient. Therefore, based on the exhaust gas 24 flowing into the turbocharger 26, an increased amount of intake air is provided by the turbocharger 26 to the cylinders 16 via intake system 12, allowing for an increased amount of fuel in the combustion chamber for combustion that occurs while maintaining the lean air-fuel mixture. This increased amount of air is an increased amount relative to the amount of air provided at the threshold load when the engine is operating in a naturally-aspirated mode. The increased amount of air and fuel provided when operating in the turbocharged mode provides for an increased range of engine loads at the lean air-fuel mixture as compared to the naturally aspirated mode. In embodiments, maintaining the lean air-fuel mixture is important to improve efficiency and improve fuel economy. In an embodiment, the stratified charge engine 10 operates in the naturally-aspirated mode when the flow control device 92 is substantially open and operates in the turbocharged mode when the flow control device 92 is substantially closed.

In embodiment, the stratified charge engine 10 operates in the turbocharged mode when two conditions are met. The first condition is that the engine is operating at a first range of speeds, such as low range of engine speeds (e.g., 0-3000 revolutions-per-minute or "RPM"). The second condition is that the engine is subject to or experiencing a load that is greater than the threshold load, such as during acceleration or when a vehicle is travelling up an incline. Accordingly, the stratified charge engine will operate in the naturally-aspirated mode, with a restricted or reduced flow of exhaust gas 24 into the turbocharger 26, when operating outside the first range of engine speeds (e.g., greater than 3000 RPM) or when the engine is subject to a load that is less than the threshold load.

In embodiments, the turbocharger 26 may be a fixed-geometry turbocharger or a variable geometry turbocharger. The flow control device 92 may be positioned in any suitable location to control flow of exhaust gas 24 through the conduit 34 and turbocharger 26. In one embodiment, the flow control device 92 is positioned at an interface between the exhaust manifold 22 and the conduit 34. In an embodiment, the flow control device 92 is a valve, such as a butterfly valve or other active valve. The intake system 12 may include a throttle body 94 to control air flow into the intake manifold 18. In embodiments, a compressor bypass valve 90 enables intake air flow to bypass the turbocharger 26 in an open position, where the compressor bypass valve 90 may be a passive type of check valve or an actively controlled valve (i.e., by controller 60). In an embodiment, the operation of the compressor bypass valve 90 is synchronized with the flow control device 92 (also referred to as the "turbine bypass valve") to ensure that proper intake charge 20 flow is provided. The EGR system 80 may be a low pressure system or high pressure system, depending upon the application.

The depicted system provides improved efficiency (i.e., fuel economy and reduced particulate emissions) for the stratified charge engine 10 at lower speed operation. Thus, in an embodiment, the turbocharger 26 is sized for operation at the lower speeds. In one embodiment, at relatively low engine loads (e.g., 35% or less), the turbocharger 26 boost is not needed and the flow control device 92 is open. Above the threshold load in the lower speed operating range, the flow control device 92 is closed to enable the turbocharger 26 to function. In addition, the compressor bypass valve 90 is closed to direct substantially all of an air intake flow 21 into the compressor of the turbocharger 26. The closed compressor bypass valve 90 allows a boost pressure to build up for the increased air provided to the combustion chambers, thus allowing the stratified charge engine 10 to operate efficiently.

Figure 2:
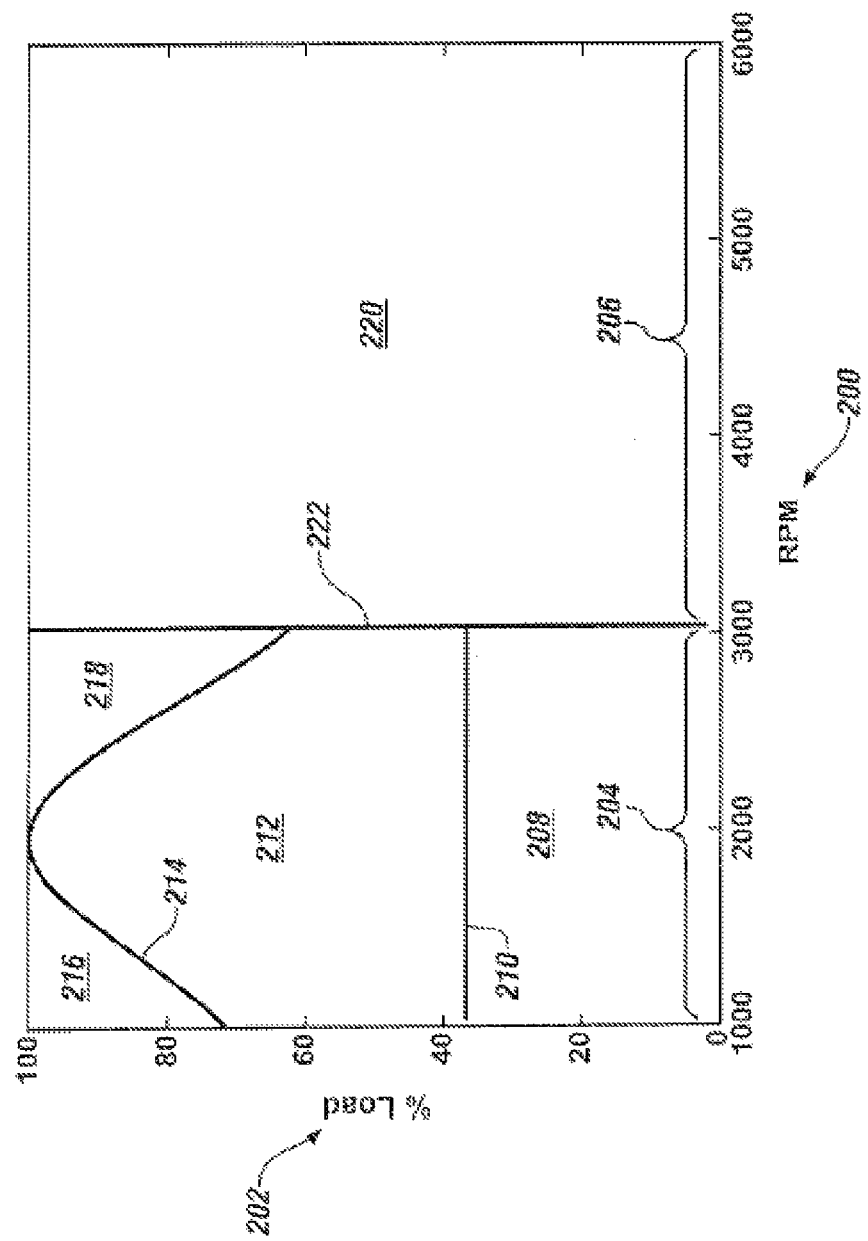
FIG. 2 is a graph of operation of an exemplary stratified charge engine across various engine speeds.

FIG. 2 illustrates a graph of operation of an embodiment of a stratified charge engine, such as the stratified charge engine 10. The graph plots engine speed on x-axis 200 versus % load for the engine on y-axis 202. The % load is a percentage of the maximum load that the engine can experience and provide. The % load may also be referred to as engine load. A first range of engine speeds 204 is lower than a second range of engine speeds 206, where the stratified charge engine operates in a naturally-aspirated mode in the second range of engine speeds 206 regardless of the engine load. A line 222 located at about 3000 RPM divides the first range of engine speeds 204 from the second range of engine speeds 206. A first region 208 is defined by the line 222 and a threshold load 210. Thus, the stratified charge engine operates in the naturally-aspirated mode for any % load value for the engine in a second region 220. In an embodiment, when operating at an engine speed in the first range of engine speeds 204, the stratified charge engine with a % load value less than the threshold load 210 is in the naturally-aspirated or "no boost" mode. In an embodiment, the threshold load 210 is a peak or maximum load at a selected engine speed (i.e., within first engine speed range 204) while the engine is operating in a naturally-aspirated mode using a lean air-fuel mixture along with a desired amount of recirculated exhaust gas. In embodiments with EGR enabled for the stratified-charge engine, the line for threshold load 210 has a low load level of about 40% because of diluted charge by the excessive amount of air (lean) and the addition of recirculated exhaust gas. In an embodiment where EGR is disabled for the stratified-charge engine, the line for threshold load would be at a different % load than depicted in FIG. 2 because the air that displaces exhaust gas results in more complete combustion. In embodiments for stratified lean operation without EGR, a threshold load of as high as 50% may be achieved. The lean air-fuel mixture provided at the threshold load 210 is an air-fuel mixture that is a substantially optimized ratio of air and fuel to provide a peak engine load with an efficient combustion of air and fuel, thus providing efficient performance at increased loads.

A third region 212, also referred to as "boost optimized region," is defined within first engine speed range 204 with % load values between the threshold load 210 and a peak load or peak boost load threshold 214. The peak boost load threshold 214 represents the peak % load provided when the stratified charge engine is operating in a boost or turbocharged mode while maintaining the lean air-fuel mixture. In embodiments, the lean air-fuel mixture (or ratio) for the peak boost load threshold 214 and threshold load 210 are substantially the same. The air-fuel ratio may also depend on engine load. In an embodiment, the air-fuel mixture is maintained at or below, with respect to lean-ness (i.e., the fuel amount is at or less the lean air-fuel ratio), the lean ratio for all % load values below the peak boost load threshold 214. The operation range available for the stratified charge engine having the turbocharger include the boost optimized region and no boost region, where the fuel and air volumetric flow intake varies while the ratio between the two flows maintain the lean ratio. Thus, the lean air-fuel mixture is maintained to provide improved efficiency at higher loads due to the expanded operating region of the third region 212 provided by boosted air intake from the turbocharger. Regions 216 and 218 represent operating regions that may provide a % load above the peak boost 214 where the lean air-fuel mixture is not maintained (e.g., richer than the lean air-fuel mixture), thus providing reduced efficiency and fuel economy. Further, the regions 216 and 218 may represent operating regions beyond the turbocharger flow capacity or speed limitation, where in such ranges the engine reverts to the naturally-aspirated mode.

As shown in FIG. 2, the shape and size of the boost optimized region (third region 212) may depend on the turbocharger's characteristics. Beyond the boost optimized region, such as in regions 216 and 218, the engine can continue to operate in stratified-charge state if the combustion system can sustain operation of sufficiently high thermal efficiencies and low emissions. Alternatively, the engine can switch to homogeneous operation (i.e., non-stratified operation). In an embodiment, the turbocharger is matched for low speeds and does not support high-speed engine air flow requirements. In such a case, it is necessary to take the turbocharger out of service by opening the turbine bypass valve under high speed conditions (i.e., second range of engine speeds 206) and allowing the stratified charge engine to operate in the naturally aspirated mode. When the improved efficiency at higher % loads is applied to a downsized turbocharged engine, it may desirable to have at least two turbochargers coupled to the stratified charge engine. In an embodiment with two turbochargers, a first turbocharger is matched for stratified-charge operation (e.g., first range of engine speeds 204) and the second turbocharger is matched for the remaining engine operating ranges (e.g., second range of engine speeds 206).

In an embodiment, the graph illustrates a difference in efficiency of the engine when operating in a turbocharged mode at lower speeds as compared to a naturally aspirated mode at lower speeds. Specifically, when in the first range of engine speeds 204 and in the naturally-aspirated mode, the engine may only operate efficiently within the region 208 at efficient air-fuel mixtures that are at or below the fuel provided in the lean air-fuel mixture at threshold load 210. Operation at loads above the threshold load 210 in the naturally-aspirated mode will be richer than the desirable lean air-fuel mix at threshold load 210 and, thus, will be less efficient. In contrast, when in the first range of engine speeds 204 and with the availability of the turbocharged mode, the engine may operate efficiently within the regions 208 (in naturally-aspirated mode) and 212 (in turbocharged mode) at efficient air-fuel mixtures that are at or below the fuel provided in the lean air-fuel mixture. Thus, the turbocharged mode provides enhanced operating range in region 212 with improved efficiency and fuel economy.

Figure 3:
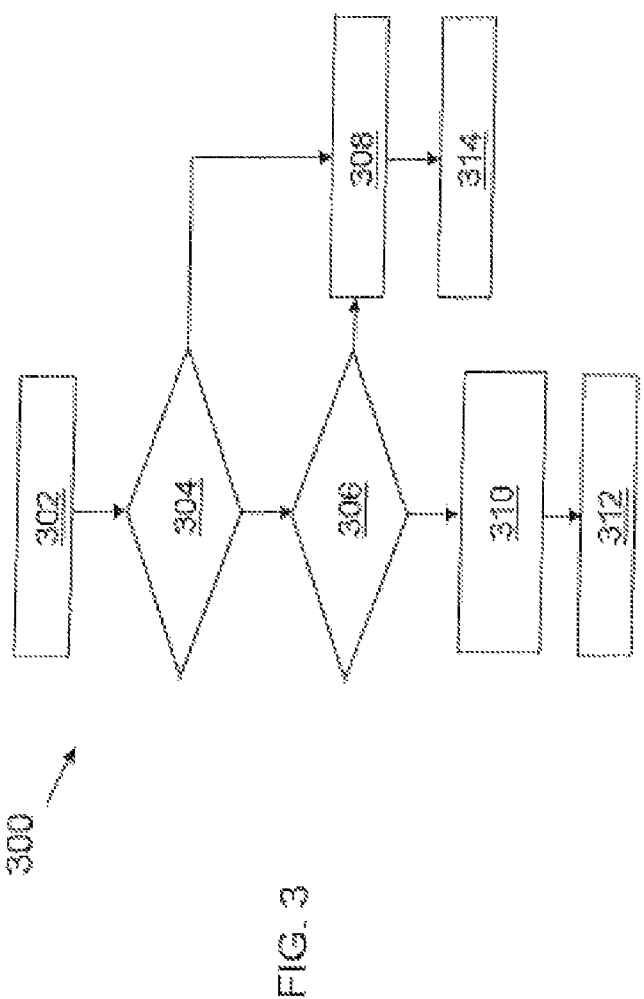
FIG. 3 is a flow chart of an exemplary method and system for turbocharging a stratified charge engine.

FIG. 3 is a flow chart 300 of an exemplary method and system for turbocharging a stratified charge engine to provide improved fuel economy at higher engine loads according to an embodiment. The method 300 may be performed by a controller and devices (e.g., flow control devices, sensors, injectors, additional controllers, etc.) coupled to and/or controlled by the controller. The method represented by the exemplary flow chart 300 initiates in block 302. In one embodiment, the method is initiated as the engine is started. In block 304, an engine speed is determined for the stratified charge engine, where, if the engine speed is in a first range ("low speed range"), the process advances to block 306. If the engine speed range is in a second range ("high speed range"), the process advances to block 308. In an embodiment, the first engine speed range is a low engine speed range and the second engine speed range is a high engine speed range relative to the first range, where the first and second ranges make up an entire range of speeds for the engine.

In block 306, a load is determined for the stratified charge engine, where the load is compared to a threshold load. If the load is less than the threshold load, the process advances to block 308. In block 308, the stratified charge engine operates in a naturally-aspirated mode, where a turbocharger coupled to the engine is substantially not operating due to reduced or no flow of exhaust gas to the turbocharger. Returning to the diagram, in block 314 a flow control device moves to an open position to substantially restrict flow of the exhaust gas into the turbocharger based on operating in the naturally-aspirated mode. The reduced or restricted flow of exhaust gas into the turbocharger causes the engine to run with the lean air-fuel mixture up to the threshold load value to provide desirable fuel economy at lower loads (relative to the threshold load) for the engine when operating in the first lower engine speed range. As described above, the reduced flow of exhaust gas into the turbocharger is due to a path of less resistance that is provided by flow through the flow control device to an exhaust conduit as compared to a flow path that moves of a turbine wheel in the turbocharger. If the load determined in block 306 is greater than the threshold load, the process advances to block 310. In block 310, the stratified charge engine operates in a turbocharged mode to provide improved fuel economy at higher loads (relative to the threshold load) for the engine when operating in the second, higher engine speed range. Accordingly, in block 312 the flow control device moves to a closed position to direct flow of the exhaust gas into the turbocharger based on operating in the turbocharged mode. The restricted or stopped flow of exhaust gas into the exhaust conduit and the flow of the exhaust gas into the turbocharger cause an increased amount of air to be provided from the turbocharger compressor to the engine's combustion chambers. The increased amount of air intake, which may also be provided at an increased pressure (relative to air intake in the naturally-aspirated mode) enables an increased amount of fuel to be provided to the combustion chambers while maintaining the lean air-fuel mixture, where the increased amount of air and fuel allows the engine to run above the threshold load value, thus providing improved fuel economy at an increased range of loads for the stratified charge engine.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for turbocharging a stratified charge engine, the method comprising:
   determining a current engine speed via a first sensor;
   determining a current load of the engine via a second sensor;
   determining a threshold load, the threshold load comprising a peak load for engine operation in a naturally-aspirated mode using a lean air-fuel mixture;
   determining a mode of operation between a turbocharged mode or a naturally-aspirated mode based on the current engine speed, the current load of the engine and the threshold load, the mode of operation being turbocharged mode when the stratified charge engine having a current load greater than the threshold load and the stratified charge engine operating in a first range of engine speeds, the mode of operation being the naturally-aspirated mode based on at least one of: the stratified charge engine having a load less than the threshold load and the stratified charge engine operating in a second range of engine speeds, the second range being greater than the first range;
   flowing, in a turbocharged mode, exhaust gas from the stratified charge engine into a turbocharger based;
   providing, by the turbocharger while in the turbocharged mode, an increased amount of air to a combustion chamber in the stratified charge engine based on the turbocharger receiving the exhaust gas, the increased amount of air substantially maintaining the lean air-fuel mixture for an increased amount of fuel provided to the combustion chamber; and
   restricting flow, in the naturally-aspirated mode, of the exhaust gas into the turbocharger by closing a flow control device.

2. The method of claim 1, wherein the flow control device is positioned in at least one of an exhaust manifold or an exhaust gas conduit in fluid communication with the combustion chamber.

3. The method of claim 1, wherein providing the increased amount of air to the combustion chamber comprises providing the increased amount of air to a plurality of combustion chambers in the stratified charge engine.

4. The method of claim 1, wherein restricting flow of the exhaust gas into the turbocharger comprises operating the stratified charge engine system in the naturally-aspirated mode.

5. The method of claim 4, wherein restricting flow of the exhaust gas further comprises directing flow of the exhaust gas to an exhaust gas conduit in fluid communication with the combustion chamber.

6. The method of claim 5, further comprising flowing a portion of the exhaust gas through an exhaust gas recirculation device in fluid communication with each of the exhaust gas conduit and an air intake charge conduit for the combustion chamber.

7. The method of claim 1, further comprising directing substantially all of an air intake flow into a compressor of the turbocharger to increase a pressure of for the increased amount of air when the stratified charge engine is operating in the turbocharged mode.

8. A method of operating a stratified charge engine system comprising a combustion chamber in a stratified charge engine, a turbocharger in fluid communication with the combustion chamber, a controller and sensors configured to perform a method, the method comprising:
determining a current engine speed;
determining a current load of the engine;
determining a threshold load, the threshold load comprising a peak load for engine operation in a naturally-aspirated mode using a lean air-fuel mixture;
determining a mode of operation between a turbocharged mode or a naturally-aspirated mode based on the current engine speed, the current load of the engine and the threshold load, the mode of operation being turbocharged mode when the stratified charge engine having a current load greater than the threshold load and the stratified charge engine operating in a first range of engine speeds, the mode of operation being the naturally-aspirated mode based on at least one of: the stratified charge engine having a load less than the threshold load and the stratified charge engine operating in a second range of engine speeds, the second range being greater than the first range;
flowing in the turbocharged mode, exhaust gas from the stratified charge engine into a turbocharger;
providing, by the turbocharger, an increased amount of air to a combustion chamber in the stratified charge engine based on the turbocharger receiving the exhaust gas, the increased amount of air substantially maintaining the lean air-fuel mixture for an increased amount of fuel provided to the combustion chamber; and
restricting, in the naturally-aspirated mode, the flow of the exhaust gas into the turbocharger by closing a flow control device.

9. The system method of claim 8, wherein the flow control device is positioned in at least one of an exhaust manifold or an exhaust gas conduit in fluid communication with the combustion chamber.

10. The system method of claim 8, wherein providing the increased amount of air to the combustion chamber comprises providing the increased amount of air to a plurality of combustion chambers in the stratified charge engine, the plurality of combustion chambers in fluid communication with the exhaust gas conduit and turbocharger.

11. The system method of claim 8, wherein restricting flow of the exhaust gas into the turbocharger comprises operating the stratified charge engine system in the naturally-aspirated mode.

12. The system method of claim 11, wherein restricting flow of the exhaust gas further comprises directing flow of the exhaust gas to an exhaust gas conduit in fluid communication with the combustion chamber.

13. The system method of claim 12, the method further comprising flowing a portion of the exhaust gas through an exhaust gas recirculation device in fluid communication with each of the exhaust gas conduit and an air intake charge conduit for the combustion chamber.

14. The system method of claim 13, the method further comprising directing, by closing a compressor bypass valve, all of an air intake flow into a compressor of the turbocharger to increase a pressure of for the increased amount of air when the stratified charge engine is operating in the turbocharged mode.

15. A stratified charge engine system comprising:
at least one combustion chamber in a cylinder head of an engine;
an exhaust gas conduit in fluid communication with the combustion chamber;
a turbocharger in fluid communication with the combustion chamber;
a flow control device, wherein a position of the flow control device controls flow of exhaust gas from the combustion chamber to the turbocharger and to the exhaust gas conduit; and
a controller coupled to the flow control device to determine a peak load for engine operation in a naturally-aspirated mode using a lean air-fuel mixture for an engine speed and receive signals from at least one sensor indicating engine speed, the controller having:
a first mode that causes the flow control device to direct flow of the exhaust gas to the turbocharger based on a load of the engine being greater than a threshold load and the stratified charge engine operating in a first range of engine speeds, the threshold load comprising the peak load for engine operation in a naturally-aspirated mode using a lean air-fuel mixture for an engine speed, and
a second mode that causes the flow control device to direct flow of the exhaust gas to the exhaust gas conduit based on the load of the engine being less than the threshold load or the engine operating in a second range of engine speeds greater than the first range of engine speeds, wherein the turbocharger provides an increased amount of air to the combustion chamber for an increased fuel intake to maintain a lean air-fuel mixture above the threshold load when operating in the first range of engine speeds.

16. The system of claim 15, wherein the exhaust gas conduit is coupled to an exhaust manifold with the flow control device positioned within at least one of the exhaust manifold or exhaust gas conduit.

17. The system of claim 15, wherein the at least one combustion chamber includes a plurality of combustion chambers in the cylinder head, the plurality of combustion chambers in fluid communication with the exhaust gas conduit and the turbocharger.

18. The system of claim 15, wherein the stratified charge engine system operates naturally-aspirated in the second mode based on the controller directing the flow of exhaust gas to the exhaust gas conduit and a reduced amount of exhaust gas to the turbocharger.

19. The system of claim 15, comprising an exhaust gas recirculation device in fluid communication with each of: the flow control device and an air intake charge conduit for the combustion chamber.

20. The system of claim 15, wherein the controller having the first mode that causes the flow control device to direct flow of the exhaust gas to the turbocharger based on the load of the engine being greater than the threshold load and the stratified charge engine operating in the first range of engine speeds further comprises the first mode being based on the load of the engine being greater than the threshold load and less than a peak boost load threshold and the stratified charge engine operating in the first range of engine speeds.

* * * * *